F. L. SHELOR.
TRAP OR OVERFLOW JAR.
APPLICATION FILED JAN. 27, 1920.
1,413,796.
Patented Apr. 25, 1922.
2 SHEETS—SHEET 2.
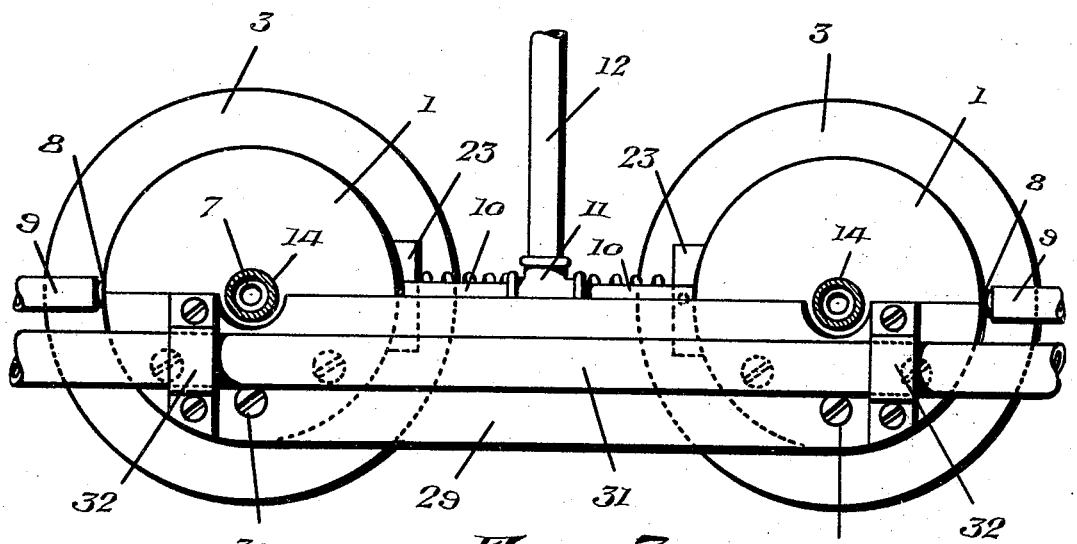
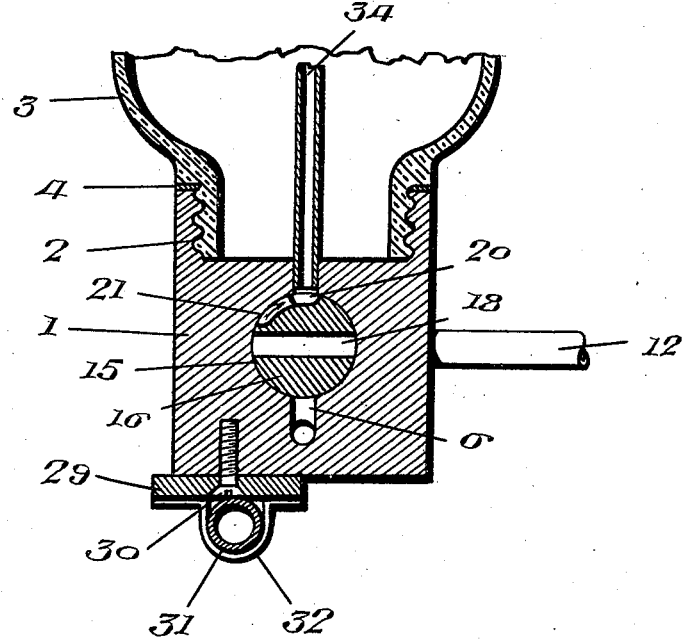
WITNESS:
INVENTOR.
F. L. SHELOR
BY Monroe E. Miller
ATTORNEY.

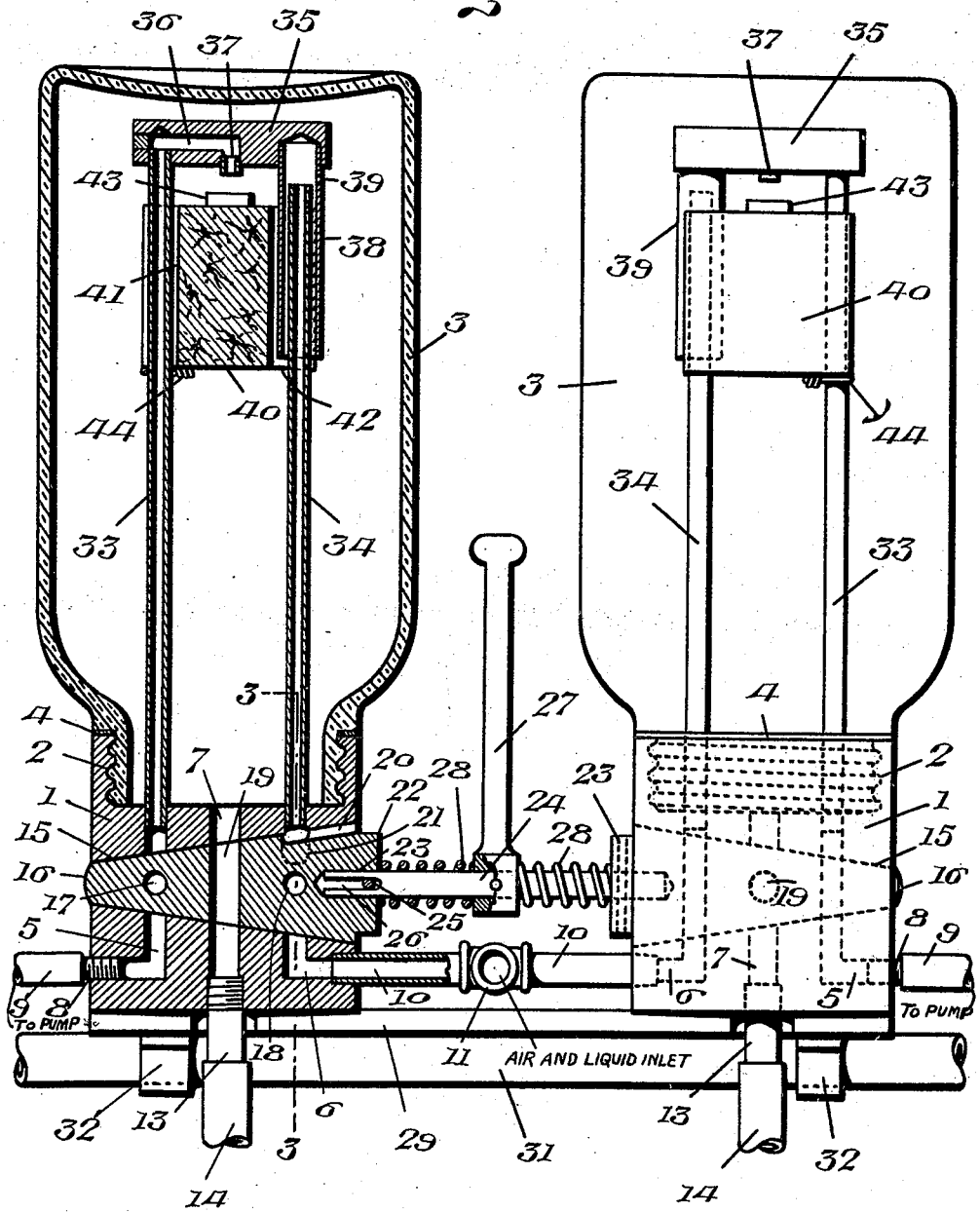

UNITED STATES PATENT OFFICE.

FREDERICK L. SHELOR, OF SALEM, VIRGINIA, ASSIGNOR TO INTERNATIONAL FILLER CORPORATION, OF PETERSBURG, VIRGINIA, A CORPORATION OF VIRGINIA.

TRAP OR OVERFLOW JAR.

1,413,796.  Specification of Letters Patent.  Patented Apr. 25, 1922.

Application filed January 27, 1920. Serial No. 354,433.

*To all whom it may concern:*

Be it known that I, FREDERICK L. SHELOR, a citizen of the United States, residing at Salem, in the county of Roanoke and State of Virginia, have invented certain new and useful Improvements in Traps or Overflow Jars, and do hereby declare the following to be a full, clear, and exact description of the invention, such as will enable others skilled in the art to which it appertains to make and use the same.

The invention relates to traps or overflow jars intended particularly for use in apparatus for filling bottles and other vessels, such as disclosed in my copending applications Serial No. 226,808 filed April 5, 1918, and Serial No. 238,503 filed June 6, 1918, although the device can be used for other purposes for which it is suited.

The trap or overflow jar is designed for use in an air conduit, such as the conduit used in such apparatus leading from the filler heads to the air pump, or the like, and is operable for trapping or catching and collecting any liquid which may flow with the air into the air conduit, thereby arresting such liquid, in order to prevent the flow thereof to the pump and to also enable such liquid to be put to use instead of being wasted. The device is also constructed with two chambers or jars whereby they can be alternated, one being discharged or emptied of its liquid contents, while the other is in use to catch the liquid passing through the air conduit. This device is in general respects similar to the overflow jar or trap disclosed in my previous Patent No. 1,244,552, granted Oct. 30, 1919, but has improvements and refinements which render the device more efficient and useful.

One of the objects of the invention is to make the device of a construction so that the parts thereof through which the liquid flows can be made of various materials, not only including various metals, but also rubber, glass, and the like, thereby enabling such parts to be made of rubber, glass or other material for the purposes of resisting corrosion or deterioration should the liquid handled contain acid or other injurious substances. In this way, it is possible to construct the device of such material as will resist the particular liquid handled, and the construction is such that it may be conveniently made of rubber, or glass as well as of metal or other materials.

Another object is to reduce a minimum number of valves required, and to simplify the construction, not only for purpose of economy and simplicity, but to also improve the operation, and enable the valves to be made of various materials as above indicated.

A further object is to assemble the parts of the device in a novel and improved, yet simple and effective manner, whereby to enhance the utility and efficiency of the device.

A still further object is the provision of a novel construction of the air inlet and outlet means, including a shield for the air inlet to prevent particles of liquid passing through the air outlet, and a float-valve for closing the air outlet.

With the foregoing and other objects in view, which will be apparent as the description proceeds, the invention resides in the construction and arrangement of parts hereinafter described and claimed, it being understood that changes can be made within the scope of what is claimed, without departing from the spirit of the invention.

The invention is illustrated in the accompanying drawings, wherein:—

Figure 1 is an elevation of the device, with one jar, valve and accompanying parts shown in vertical section.

Fig. 2 is a bottom plan view of the device.

Fig. 3 is a sectional detail taken on the line 3—3 of Fig. 1.

The device comprises right and left hand chambers, each of which has a cylindrical base 1, which may be of a block of suitable metal, rubber, glass or other appropriate material, according to the liquid used. The bases 1 are provided in their upper ends with screw-threaded sockets 2 receiving the screw-threaded necks of a pair of inverted glass jars 3, which are conveniently used to provide the trap chambers having transparent walls whereby the parts therein as well as the liquid can be observed. Furthermore, these jars can be readily unscrewed from the bases, and removed for purposes of cleaning, repair or inspection. Gaskets 4 are preferably provided between the shoulders of said jars and rims of the sockets 2 to prevent leakage. Each base 1 is provided with passages 5 and 6 extending downwardly vertically from the bottom of the socket or recess 2 and extending angularly at their lower ends to opposite sides of the base, and said base has a vertical outlet passage or drain port 7 extending vertically between the passages 5 and 6 from the bottom of the socket 2 to the bottom of the base. Nipples 8 or other connections are threadedly or otherwise engaged with the bases 1 in communication with the lower ends of the passages 5, for the connection of tubes or hose 9 leading to an air pump or other device for drawing air through the air conduit, and nipples or pipe sections 10 are secured to the base 1 in communication with the lower ends of the passages 6 and extend to a T-coupling 11 from which the pipe 12 extends to pass to the filler heads or other appliances, according to the use to which the device is put. A nipple or other connection 13 is threadedly or otherwise engaged with the lower end of each base 1 in communication with the lower end of the passage or port 7 for the connection of the tube or pipe 14 which will deliver the liquid from the corresponding chamber to a suitable receptacle, which may be the tank or reservoir from which the liquid is drawn by the air suction for filling bottles or other vessels, or the like, as disclosed in pending applications above referred to.

A single valve is mounted in each base 1 for controlling all three passages 5, 6 and 7, as well as admitting air from the atmosphere into the corresponding chamber under certain conditions, as will hereinafter more fully appear, and, for this purpose, each base 1 is provided with a horizontal diametrical bore 15 extending therethrough and of tapered form with its largest end at that side of the base nearest the passage 6. This bore 15 intersects each of the passages 5, 6 and 7, and has fitted therein a tapered or frusto-conical valve 16, which may be of metal, rubber, glass or other suitable material, the same as the base. Each valve 16 has diametrical ports 17 and 18 adapted to register simultaneously with the passages 5 and 6, and an intermediate diametrical port 19 at an angle with the ports 17 and 18 to register with the passage 7 when the ports 17 and 18 are moved out of registration with the respective passages 5 and 6, so that the passages 5, 6 and the passage 7 are opened alternately when the valve is oscillated from one position to another.

The passage 5 of each base 1 is for the outlet of air from the chamber, the passage 6 is for the inlet of liquid and air, and the passage 7 for the discharge of liquid from the chamber by gravity, and to admit air into the chamber when the liquid is discharged, the valve 16 is provided with a channel 20 extending longitudinally from its larger end to a point to communicate with the upper portion of the passage 6 when the valve 16 is turned to bring the port 19 into registration with the passage 7. The outer end of the channel 20 communicates with the atmosphere, and the inner end has an angular extension 21 extending partially around the circumference of the valve close to one end of the port 18, as seen in Fig. 3, whereby when the valve is turned from a position with the ports 17 and 18 in registration with the respective passages 5 and 6 to a position with the port 19 in registration with the passage 7, the extension 21 of the valve will be brought into registration with the upper portion of the passage 6 prior to the registration of the port 19 with the passage 7, for reasons hereinafter explained. Thus, when the passage 6 is closed by the valve 16, the channel 20 establishes communication between the upper portion of said passage and the atmosphere for the entrance of air to relieve the vacuum in the chamber. The channel 20 of each valve therefore serves as an air inlet leading from the atmosphere, and the flow through the channel 20 into the chamber is established and shut off at the same time as the flow of liquid through the passage 7, with the exception that the extension 21 of the channel 20 establishes the flow quicker through the channel 20 and maintains it longer than the flow through the passage 7 as the valve 16 is turned to establish and shut off such flow.

As above indicated, the bases or blocks 1 and valves 16 can be made of various materials, and the valves can be ground and seated snugly within the bores 15, providing a simple yet efficient construction, using only a single valve in each base. The valves 16 are operated simultaneously, and, for this purpose, the bases 1 are in reversed positions with the larger ends of the bores 15 and valves 16 confronting one another. The larger ends of the valves have outstanding bosses 22 and central recesses 23, and a single valve stem 24, common to both valves, has its opposite ends fitted within said recesses 23. The ends of the stem 24 are slotted, as at 25, so as to fit astride pins 26 inserted diametrically through the bosses 22 and recesses 23, in order that the valves will turn with said rod or stem 24, and a suitable handle or lever 27 is secured on the intermediate portion of said stem for turning the valves. The two valves 16 are in angular relation, whereby the two sections or chambers of the trap operate alternately, and by oscillating the handle or lever 27, the valves are conveniently reversed. Coiled wire expansion springs 28 surround the stem or rod 24 and are confined between the handle 27 and bosses 22 of the valves, whereby to separate the valves and force them against their seats under spring tension, to maintain a tight fit between the valves and bases or blocks to avoid leakage.

In order to support the bases 1 they are seated and secured upon a longitudinal plate or bar 29 by means of screws 30 or the like, which serve to hold said bases rigidly in spaced relation. This plate or bar 29 may be seated on a horizontal pipe or support 31, which may constitute one of the conduits of the apparatus, and clips 32 are secured to the plate 29 and pass under the pipe or support 31 for holding the plate thereon. In this way, the trap or jars can be mounted on a pipe constituting one of the conduits of the filling apparatus, and the bases 1 being secured to the plate 29 and will be held in place with the valves and spring means located between such bases.

Two vertical tubes 33 and 34 are secured at their lower ends to each base 1 within the socket 2 in communication with the upper ends of the respective passages 5 and 6, and extend upwardly to a point near the upper end of the corresponding jar 3, the tube 34 thus leading the air and liquid upwardly to discharge into the chamber, and the tube 33 withdrawing the air from the upper portion of the chamber. This is for the purpose of avoiding the flow of air, either into the chamber or out of same, through the liquid, thereby avoiding unnecessary agitation as would result by the flow of air therethrough.

A yoke member 35 extends over the upper ends of said tubes 33 and 34, and is secured on the upper end of the tube 33 which supports it, said member having a passage 36 in communication with the upper end of said tube 33 and leading to a nipple 37 depending from said yoke between said tubes through which the air leaves the upper portion of the chamber. A sleeve 38 is secured at its upper end within the yoke member 35 and depends therefrom loosely around the upper terminal of the pipe 34, thereby providing a shield and baffle to prevent particles of liquid passing from the tube 34 into the tube 33. This shield or baffle serves to prevent the passage of liquid with the air into the upper end of the tube 33 by compelling the air and liquid to flow downwardly from said sleeve 38 along the tube 34. The sleeve 38, however, has a restricted aperture 39 adjacent to the upper end of the tube 34 at that side opposite to the nipple 37 and tube 33 for the restricted flow of air therethrough, should the liquid level within the chamber rise to or above the lower end of the sleeve.

In order to automatically shut off the flow of air and liquid into the chamber when the chamber becomes filled up to a predetermined level, below the upper ends of the tubes 33 and 34, a float 40 is movable vertically between said tubes, and has slots 41 and 42 receiving the tube 33 and sleeve 38 whereby they serve as guides for said float. The float may be of cork or other buoyant material and carries a valve 43 at its upper end to seat against the nipple 37 when the float is raised, thereby closing the air outlet. A wire or other suitable stop 44 is secured on the tube 33 to support the float when it is lowered and to limit the downward movement of the float, whereby the float is supported at a slight distance below its uppermost position when the liquid level in the chamber is below the maximum allowed. This avoids unnecessary excessive movement of the float, and, furthermore, it is maintained in a position ready for operation when the liquid level rises to the maximum height permitted, so as to seat the valve 43 and prevent further entrance of liquid, thereby avoiding the overflow of liquid into the air outlet tube 33 as would be objectionable as it would negative the function of the device.

The operation of the trap is as follows; Supposing that the handle 27 is moved to bring the valves 16 to the position as shown in Fig. 1, then the passages 5 and 6 of the right hand chamber will be opened and the passages 5 and 6 of the left hand chamber closed, while the passage 7 of the right hand chamber is closed and the passage 7 of the left hand chamber opened. This air is therefore withdrawn from the right hand chamber and right hand pipe or tube 10, while the flow of air through the left hand chamber is shut off. The liquid can drain from the left hand chamber through the passage 9, and air is admitted through the channel 20 and tube 34. The right hand chamber is now in operation to trap or catch the liquid. Any liquid which passes with the air through the right hand tube 10, will flow up through the tube 34 and down the sleeve 38 into the chamber, wherein the liquid drops and is trapped. The particles of liquid drop to the bottom of the chamber, whereas the air passes on out, flowing upwardly within the nipple 37 and down through the tube 33 and passage 5 into the nipple or tube 9. Thus, any liquid passing with the air as far as the chamber, will be trapped within the chamber, thereby separating it from the air and preventing the liquid passing to the pump, as well as catching the liquid so that it can be used. Should the liquid in the right hand jar fill the same to a level near the upper end of the tubes 33 and 34, this will raise the float 40, so as to seat the valve 43 against the nipple 37, thereby preventing further flow of air out of and liquid into the chamber, and preventing the overflow of the liquid into the air outlet tube 34. Thus, should the operator fail to alternate the device by swinging the handle 27, the flow is automatically shut off to avoid overfilling. When the liquid level rises to and above the lower end of the sleeve 38, the aperture 39 permits the air to flow out of the sleeve from over the upper end of the tube 34 to avoid agitation of the liquid within the lower end of the sleeve, said aperture 39 being sufficient to avoid the liquid being blown from said sleeve by the pressure. The aperture 39 thus serves as a vent for the flow of air out of the sleeve or shield 38 in the event that the liquid closes the lower end of the sleeve, which, without the provision of the aperture 39, would result in the liquid column being forced down within the sleeve and the liquid agitated. The aperture, however, lets the air escape and prevents such agitation of the liquid within the sleeve. The operator, can, at any time, reverse the valves 16 by swinging the handle 27, so that when the right hand jar is filled, the operator in swinging the handle 27 to its other position will reverse the position of the valves from that shown in Fig. 1. The passages 5 and 6 of the right hand chamber would now be closed, and the passage 7 opened and during such movement of the right hand valve, the channel 20 is brought into registration with the lower end of the tube 34, thus admitting air into the chamber so that the liquid can drain out through the passage 7, the float 40 dropping away from the nipple 37 and seating on the stop 44. Due to the angular extension 21 of the channel 20, said channel will be brought into communication with the tube 34 before the port 19 registers with the passage 7, thereby admitting air into the chamber to relieve the partial vacuum therein, before the passage 7 is opened, for otherwise, air would be drawn upwardly through the passage 7 and would bubble up through the liquid, agitating same to an objectionable extent. By first admitting air through the tube 34, this brings the air in the upper portion of the chamber to atmospheric pressure, so that the liquid will drain out without any bubbling or agitation. The reversal of the valves will set the left hand valves 16 so that the passages 5 and 6 are opened and the passage 7 closed, thereby the air now flows through the left hand jar which serves to catch the liquid, while the right hand jar is being emptied and prepared to resume its duty as soon as the left hand jar is filled and the valves reversed back to the position shown in Fig. 1.

Not only can the bases 1 and valves 16 be made of various materials, such as metal, rubber, glass and the like, but the tubes 33 and 34, yoke members 35 and sleeves 38 can also be of such materials, in order that the parts of the device through which the liquid flows can be of any suitable or appropriate material to resist the corrosive or injurious attacks of aciduous or other liquids. The bases 1 and valves 16 are of simple construction and can be manufactured by either moulding, turning or other operation, according to the material of which they are made.

Having thus described the invention, what is claimed as new is:—

1. A trap comprising a pair of chambers each having a base of suitable material provided with a liquid inlet passage, an air passage, and a liquid outlet passage, a single valve of suitable material inserted in each base for closing said passages, and having means for alternately opening the liquid outlet passage and liquid inlet and air outlet passages, and also having means for admitting air into the chamber when the liquid outlet passage is opened, and means connected to both valves for alternating them.

2. A trap comprising a chamber having a base of suitable material provided with a liquid inlet passage, an air outlet passage, and a liquid outlet passage, said base having a bore intersecting said passages, a single valve for each base inserted in and rotatable in said bore thereof for closing said passages and having ports so arranged to alternately open the liquid outlet passage and the liquid inlet and air outlet passages, said valve also having means for admitting the air into the chamber when the liquid outlet passage is open, and means connected to both valves for alternating them.

3. A trap comprising a chamber having a base provided with a liquid inlet passage, an air outlet passage, a liquid outlet passage, and a bore intersecting said passages, and a valve fitted for rotation within said bore to close said passages and having ports arranged to alternately open the liquid outlet passage and the liquid inlet and air outlet passages, said valve having a channel communicating with the atmosphere and arranged to register with the upper portion of the air inlet passage when the liquid outlet passage is opened.

4. A trap comprising a pair of chambers each having a base provided with a liquid inlet passage, an air outlet passage, and a liquid outlet passage, a valve mounted in each base for closing the passages and having means for alternating opening the liquid outlet passage and liquid inlet and air outlet passages, and operating means connected to both valves for simultaneously operating them, said valves having means for admitting air into the respective chambers when the corresponding liquid outlet passages are opened.

5. A trap comprising a pair of chambers each having a base provided with air and liquid passages, a rotary valve mounted in each base for controlling the flow of air and liquid, and an oscillatory stem having its opposite ends engaging the valves for simultaneously turning them.

6. A trap comprising a pair of chambers each having a base provided with air and liquid passages and a tapered bore intersecting said passages, a tapered valve fitted within each bore and having means for opening said passages, the larger ends of the valves being disposed toward one another, and means located between the valves and engaging the larger ends thereof for turning the valves simultaneously and separating them to seat them within the bores.

7. A trap comprising a pair of chambers each having a base provided with air and liquid passages and a tapered bore intersecting said passages, tapered valves fitting within said bores and having means for controlling said passages, the larger ends of the valves being disposed toward one another, an oscillatory valve stem common to both valves and having its opposite ends engaged with the larger ends of the valves, and spring means on said stem for separating the valves to seat them within said bores.

8. A trap comprising a chamber, upstanding inlet and outlet tubes within the chambers, a member secured to the upper end of the outlet tube and having a depending nipple communicating with said tube, and a float movable vertically between the tubes and having a valve seatable upwardly against said nipple.

9. A trap comprising a chamber, upstanding inlet and outlet tubes therein, and a sleeve depending over the upper terminal of the inlet tube and serving as a shield.

10. A trap comprising a chamber, upstanding inlet and outlet tubes therein, and a sleeve depending over the upper terminal of the inlet tube to serve as a shield, and provided near the upper end of said tube with a restricted aperture.

11. A trap comprising a chamber, inlet and outlet tubes upstanding within said chamber, a member secured to the upper end of the outlet tube and having a depending nipple communicating therewith, a sleeve depending from said member over the upper terminal of the inlet tube to serve as a shield, and a float movable between the outlet tube and sleeve and having a valve seatable against said nipple.

In testimony whereof I hereunto set my hand.

FRED. L. SHELOR.

Witnesses:
HERBERT ROGERS,
F. C. SCHOFIELD.